US009967858B2

(12) United States Patent
Bangolae et al.

(10) Patent No.: US 9,967,858 B2
(45) Date of Patent: May 8, 2018

(54) METHOD AND APPARATUS FOR CONFIGURING AND USING SMALL DATA RADIO BEARERS

(71) Applicant: Intel IP Corporation, Santa Clara, CA (US)

(72) Inventors: Sangeetha L. Bangolae, Beaverton, OR (US); Marta Martinez Tarradell, Hillsboro, OR (US); Hyung-Nam Choi, Hamburg (DE); Ana Lucia Pinheiro, Portland, OR (US); Puneet Jain, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 239 days.

(21) Appl. No.: 14/766,850

(22) PCT Filed: Dec. 17, 2013

(86) PCT No.: PCT/US2013/075633
§ 371 (c)(1),
(2) Date: Aug. 10, 2015

(87) PCT Pub. No.: WO2014/133651
PCT Pub. Date: Sep. 4, 2014

(65) Prior Publication Data
US 2015/0373733 A1 Dec. 24, 2015

Related U.S. Application Data

(60) Provisional application No. 61/771,698, filed on Mar. 1, 2013.

(51) Int. Cl.
*H04W 72/10* (2009.01)
*H04W 72/00* (2009.01)
(Continued)

(52) U.S. Cl.
CPC ........ *H04W 72/005* (2013.01); *H04B 7/0452* (2013.01); *H04B 7/0486* (2013.01);
(Continued)

(58) Field of Classification Search
CPC .............................. H04W 24/00; H04L 43/50
See application file for complete search history.

(56) References Cited

U.S. PATENT DOCUMENTS 9,049,588 B2 * 6/2015 Choi ...................... H04W 8/245
9,668,252 B2 * 5/2017 Miklos .................. H04W 76/04
(Continued)

FOREIGN PATENT DOCUMENTS

CN 101681472 A 3/2010
CN 102835178 A 12/2012
(Continued)

OTHER PUBLICATIONS

"International Application Serial No. PCT/US2013/075100, International Preliminary Report on Patentability dated Sep. 11, 2015", 7 pgs.
(Continued)

*Primary Examiner* — Zhiren Qin
(74) *Attorney, Agent, or Firm* — Schwegman Lundberg & Woessner, P.A.

(57) ABSTRACT

Apparatuses and methods for control of small data transmission by a user equipment (UE) are described herein. The UE may determine that data to be transmitted by the UE is small data if a size of the data is below a threshold. The UE may transmit a message indicating that the UE shall be transmitting small data responsive to determining that data to be transmitted by the UE is small data. The UE may receive a radio resource control (RRC) signal from an evolved Node B (eNodeB) that includes a logical channel identifier (LCID) of a small data radio bearer (SDRB)
(Continued)

configured for transmission of small data. The UE may transmit small data on the SDRB subsequent to receiving the RRC signal from the eNodeB. The UE may refrain from transmitting other than small data on the SDRB. Other apparatuses and methods are described.

12 Claims, 6 Drawing Sheets

(51) Int. Cl.
| | |
|---|---|
| H04B 7/04 | (2017.01) |
| H04B 7/0452 | (2017.01) |
| H04W 36/14 | (2009.01) |
| H04W 36/22 | (2009.01) |
| H04L 5/00 | (2006.01) |
| H04L 12/741 | (2013.01) |
| H04B 7/06 | (2006.01) |
| H04W 24/10 | (2009.01) |
| H04W 72/04 | (2009.01) |
| H04W 72/08 | (2009.01) |
| H04L 29/06 | (2006.01) |
| H04L 29/08 | (2006.01) |
| H04W 4/10 | (2009.01) |
| H04W 12/02 | (2009.01) |
| H04W 12/04 | (2009.01) |
| H04W 76/02 | (2009.01) |
| H04W 24/02 | (2009.01) |
| H04W 24/08 | (2009.01) |
| H04L 12/18 | (2006.01) |
| H04W 52/24 | (2009.01) |
| H04W 16/14 | (2009.01) |
| H04W 76/04 | (2009.01) |
| H04W 36/16 | (2009.01) |
| H04W 36/30 | (2009.01) |
| H04J 3/12 | (2006.01) |
| H04W 48/10 | (2009.01) |
| H04W 48/20 | (2009.01) |
| H04M 15/00 | (2006.01) |
| H04L 25/03 | (2006.01) |
| H04W 4/00 | (2018.01) |
| H04W 88/06 | (2009.01) |
| H04W 88/02 | (2009.01) |
| H04W 88/08 | (2009.01) |
| H04W 84/18 | (2009.01) |
| H04W 4/06 | (2009.01) |

(52) U.S. Cl.
CPC ........... *H04B 7/0626* (2013.01); *H04J 3/12* (2013.01); *H04L 5/0037* (2013.01); *H04L 12/184* (2013.01); *H04L 25/03* (2013.01); *H04L 45/74* (2013.01); *H04L 65/4038* (2013.01); *H04L 65/608* (2013.01); *H04L 65/80* (2013.01); *H04L 67/02* (2013.01); *H04M 15/8044* (2013.01); *H04W 4/10* (2013.01); *H04W 12/02* (2013.01); *H04W 12/04* (2013.01); *H04W 16/14* (2013.01); *H04W 24/02* (2013.01); *H04W 24/08* (2013.01); *H04W 24/10* (2013.01); *H04W 36/14* (2013.01); *H04W 36/165* (2013.01); *H04W 36/22* (2013.01); *H04W 36/30* (2013.01); *H04W 48/10* (2013.01); *H04W 48/20* (2013.01); *H04W 52/244* (2013.01); *H04W 72/044* (2013.01); *H04W 72/0406* (2013.01); *H04W 72/085* (2013.01); *H04W 72/087* (2013.01); *H04W 72/10* (2013.01); *H04W 76/02* (2013.01); *H04W 76/023* (2013.01); *H04W 76/04* (2013.01); *H04W 76/046* (2013.01); *H04W 4/008* (2013.01); *H04W 4/06* (2013.01); *H04W 84/18* (2013.01); *H04W 88/02* (2013.01); *H04W 88/06* (2013.01); *H04W 88/08* (2013.01); *Y02B 60/50* (2013.01)

(56) References Cited

U.S. PATENT DOCUMENTS

| | | |
|---|---|---|
| 2011/0038431 A1 | 2/2011 | Frederiksen et al. |
| 2011/0205941 A1 | 8/2011 | Stanforth |
| 2011/0274066 A1 | 11/2011 | Tee et al. |
| 2012/0009963 A1 | 1/2012 | Kim et al. |
| 2012/0051309 A1 | 3/2012 | Kim et al. |
| 2012/0063373 A1 | 3/2012 | Chincholi et al. |
| 2012/0254890 A1 | 10/2012 | Li et al. |
| 2012/0269108 A1 | 10/2012 | Zhai et al. |
| 2012/0276913 A1* | 11/2012 | Lim ............... H04W 12/08 455/450 |
| 2012/0329400 A1 | 12/2012 | Seo et al. |
| 2013/0016639 A1 | 1/2013 | Xu et al. |
| 2013/0017779 A1* | 1/2013 | Song ............. H04W 76/005 455/39 |
| 2013/0080597 A1* | 3/2013 | Liao ............... H04W 4/005 709/219 |
| 2013/0083765 A1* | 4/2013 | Ai ................. H04W 4/005 370/329 |
| 2013/0138817 A1* | 5/2013 | Zhang ............ H04L 63/104 709/226 |
| 2013/0201924 A1* | 8/2013 | Song ............. H04W 76/02 370/329 |
| 2013/0250882 A1 | 9/2013 | Dinan |
| 2013/0272215 A1 | 10/2013 | Khoryaev et al. |
| 2013/0279376 A1 | 10/2013 | Ahmadi |
| 2013/0301609 A1 | 11/2013 | Smith et al. |
| 2013/0308504 A1 | 11/2013 | Nimbalker et al. |
| 2013/0308564 A1* | 11/2013 | Jain ............... H04B 15/00 370/329 |
| 2014/0016614 A1* | 1/2014 | Velev ............. H04W 4/005 370/331 |
| 2014/0044072 A1 | 2/2014 | Piggin |
| 2014/0105134 A1 | 4/2014 | Buddhikot et al. |
| 2014/0119265 A1 | 5/2014 | Shauh et al. |
| 2014/0185575 A1* | 7/2014 | Morioka ......... H04W 72/1268 370/329 |
| 2014/0247766 A1 | 9/2014 | Zhang et al. |
| 2015/0118993 A1* | 4/2015 | Rune ............. H04W 12/08 455/410 |
| 2015/0195831 A1* | 7/2015 | Du ................ H04W 74/004 370/329 |
| 2015/0382201 A1 | 12/2015 | Chou et al. |
| 2016/0007319 A1 | 1/2016 | He et al. |

FOREIGN PATENT DOCUMENTS

| | | |
|---|---|---|
| CN | 104956721 A | 9/2015 |
| CN | 105009664 A | 10/2015 |
| EP | 2509345 A1 | 10/2012 |
| KR | 1020110093581 A | 8/2011 |
| KR | 1020120071229 A | 7/2012 |
| WO | WO-2012051303 A1 | 4/2012 |
| WO | WO-2012172155 A1 | 12/2012 |
| WO | WO-2014133641 A1 | 9/2014 |
| WO | WO-2014133651 A1 | 9/2014 |
| WO | WO-2014133652 A1 | 9/2014 |

OTHER PUBLICATIONS

"International Application Serial No. PCT/US2013/075633, International Preliminary Report on Patentability dated Sep. 11, 2015", 10 pgs.

(56) References Cited

OTHER PUBLICATIONS

"International Application Serial No. PCT/US2013/075768, International Preliminary Report on Patentability dated Sep. 11, 2015", 8 pgs.
"U.S. Appl. No. 14/766,858, Non Final Office Action dated Dec. 16, 2016", 18 pgs.
"Chinese Application Serial No. 201380071532.8, Voluntary Amendment filed Feb. 5, 2016", 12 pgs.
"European Application Serial No. 13876599.5, Extended European Search Report dated Sep. 23, 2016", 9 pgs.
"MBMS Service continuity for UE configured with CA", LG Electronics Inc; 3GPP Draft; R2-123458 MBMS Service Continuity for CA UE, 3rd Generation Partnership Project (3GPP), Mobile Competence Centre ; 650, Route Des Lucioles; F-06921 Sophia-Antipolis Ceder ; France, vol. RAN WG2, No. Qingdao, China, [Online] Retrieved from the Internet:<URL:http://www.3gpp.org/ftp/tsg_ran/WG2_RL2/TSGR2_79/Docs/> [retrieved on Aug. 7, 2012], (Aug. 7, 2012).
"On New Carrier Type", Ericsson; 3GPP Draft; R1-130546, 3rd Generation Partnership Project (3GPP), Mobile Competence Centre ; 650, Route Des Lucioles ; F-06921 Sophia-Antipolis Ceder ; France, vol. RAN WG1, No. St. Julian, [Online] Retrieved from the Internet:<URL:http://www.3gpp.org/ftp/tsg_ran/WG1_RL1/TSG R1_72/Docs/>, (Jan. 19, 2013).
"Resource Allocation Methods for NCT", R1-122876, 3GPP TSG-RAN WG1 #69, Prague, CZ, (May 21, 2012).
"U.S. Appl. No. 14/766,858, Response filed Mar. 15, 2017 to Non Final Office Action dated Dec. 16, 2016", 12 pgs.
"U.S. Appl. No. 14/766,858, Final Office Action dated Oct. 13, 2017", 19 pgs.
"U.S. Appl. No. 14/766,858, Non Final Office Action dated May 23, 2017", 17 pgs.
"U.S. Appl. No. 14/766,858, Preliminary Amendment filed Aug. 10, 2015", 8 pgs.
"U.S. Appl. No. 14/766,858, Response filed Aug. 23, 2017 to Non Final Office Action dated May 23, 2017", 13 pgs.
"U.S. Appl. No. 14/766,873, Non Final Office Action dated Jan. 27, 2017", 21 pgs.
"U.S. Appl. No. 14/766,873, Notice of Allowance dated Jul. 11, 2017", 9 pgs.
"U.S. Appl. No. 14/766,873, Response filed to Apr. 27, 2017 to Non Final Office Action dated Jan. 27, 2017", 14 pgs.
"European Application Serial No. 13876599.5, Response Filed Apr. 19, 2017 to Extended European Search Report dated Sep. 23, 2016", 14 pgs.
"International Application Serial No. PCT/US2013/075100, International Search Report dated May 19, 2014", 3 pgs.
"International Application Serial No. PCT/US2013/075100, Written Opinion dated May 19, 2014", 5 pgs.
"International Application Serial No. PCT/US2013/075633, International Search Report dated Apr. 10, 2014", 3 pgs.
"International Application Serial No. PCT/US2013/075633, Written Opinion dated Apr. 10, 2014", 8 pgs.
"International Application Serial No. PCT/US2013/075768, International Search Report dated Apr. 18, 2014", 3 pgs.
"International Application Serial No. PCT/US2013/075768, Written Opinion dated Apr. 18, 2014", 6 pgs.
"Resource Allocation Methods for NCT", Qualcomm Incorporated, [Online]. Retrieved from Internet: <(http://www.3gpp.org/ftp/tsg_ran/wgI_r1I/TSGRI_69/Docs/)>, (May 21-25, 2012).
U.S. Appl. No. 14/766,873, filed Aug. 10, 2015, Spectrum Sharing Based on Self-Organizing Networks.
U.S. Appl. No. 14/766,858, filed Aug. 10, 2015, Method and Apparatus for Multimedia Broadcast Multicast Service (MBMS) Control Information Delivery.
"Chinese Application Serial No. 201380071495.0, Office Action dated Nov. 30, 2017", w/ English First Search Report and Claims, 16 pgs.
"U.S. Appl. No. 14/766,858, Advisory Action dated Jan. 25, 2018", 3 pgs.
"U.S. Appl. No. 14/766,858, Response filed Jan. 16, 2018 to Final Office Action dated Oct. 13, 2017", 10 pgs.
"U.S. Appl. No. 15/810,832, Preliminary Amendment filed Dec. 27, 2017", 6 pgs.
U.S. Appl. No. 15/810,832, filed Nov. 13, 2017, Spectrum Sharing Based on Self-Organizing Networks.
"U.S. Appl. No. 14/766,858, Response filed Feb. 13, 2018 to Advisory Action dated Jan. 25, 2018", 10 pgs.
"Chinese Application Serial No. 201380071532.8, Office Action dated Dec. 5, 2017", w/English Translation, 13 pgs.

* cited by examiner

| 8 | 7 | 6 | 5 | 4 | 3 | 2 | 1 | |
|---|---|---|---|---|---|---|---|---|
| \multicolumn{4}{c|}{Device properties IEI} | 0 Spare | 0 Spare | Small Data | Low priority | octet 1 |

FIG. 4

METHOD AND APPARATUS FOR CONFIGURING AND USING SMALL DATA RADIO BEARERS

PRIORITY CLAIM

This application is a U.S. National Stage Application under 35 U.S.C. 371 from International Application No. PCT/US2013/075633, filed Dec. 17, 2013, which claims priority to U.S. Provisional Patent Application No. 61/771,698, filed on Mar. 1, 2013, the contents of which are incorporated herein by reference in their entirety.

TECHNICAL FIELD

Embodiments described herein pertain generally to communications networks serving machine-type communications (MTC) devices or devices that run MTC applications or services and in particular, to methods and apparatus for configuring and using small data radio bearers for transmission of small data or low priority data in such networks.

BACKGROUND

Existing communications networks are increasingly integrating low-cost, low power, low-capability machine-type communications devices to perform services independent of direct human interaction. MTC devices may transmit small amounts of data, and these transmissions may be of relatively low priority. However, because relatively large numbers of MTC devices may make such transmissions, and because MTC devices may transmit relatively frequently compared to other devices, these transmissions can place a significant burden on networks. Thus, there is a need to improve the efficiency with which MTC devices and other small-data transmission devices use uplink and downlink communication resources.

BRIEF DESCRIPTION OF THE DRAWINGS

FIG. 4 is an example Device Properties information element in accordance with some embodiments;

DETAILED DESCRIPTION

Recently, there has been an increase in the usage of MTC (Machine-type communications) devices. MTC refers to data communications between machines that do not necessarily need human interaction. The communications may occur over mobile networks. Current 3rd Generation Partnership Project (3GPP) standards for both Universal Mobile Telecommunications System (UMTS) and Long-term Evolution (LTE) support MTC, and other standards will likely support MTC.

Figure 1:
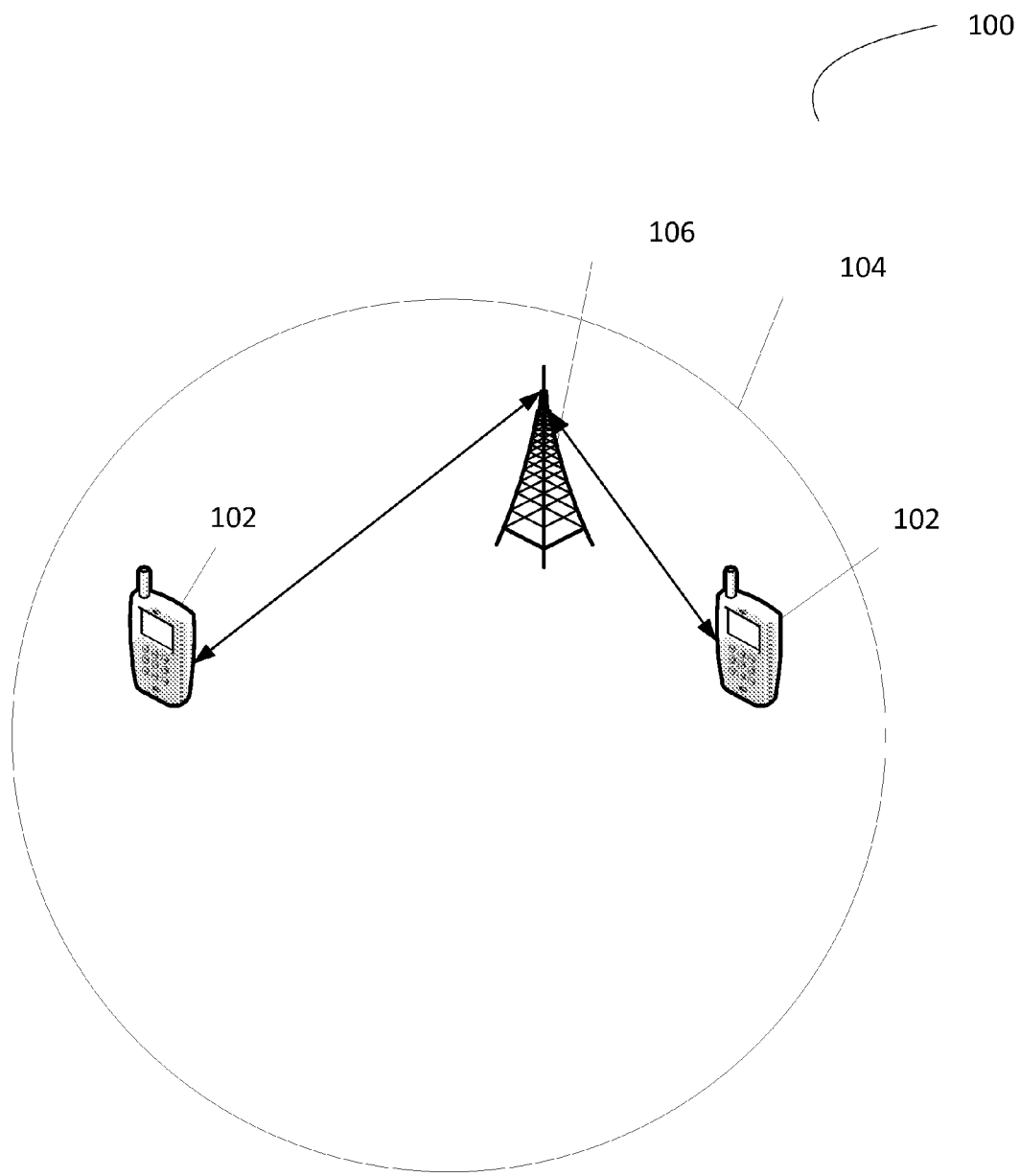
FIG. 1 is a schematic diagram illustrating a system in which some embodiments may be implemented.

FIG. 1 is a schematic diagram illustrating a system 100 in which some embodiments may be implemented. The system 100 can include one or more devices 102 within a geographical area 104 that is served by, for example evolved Node B (eNodeB) 106, although embodiments are not limited to communications through an eNodeB and may comprise embodiments that communicate through a base station or other element. The devices 102 can be MTC devices. The devices 102 can communicate bidirectionally with the eNodeB 106. For example, the devices 102 can transmit on the uplink (UL) to the eNodeB 106 and receive on the downlink (DL) from the eNodeB 106. A device 102 can be configured with any number of MTC applications or other applications. A device 102 may establish data radio bearers (DRBs) on the RAN side to exchange data with the eNodeB 106.

The devices 102 may individually comprise any low-mobility, low-power, and/or low-functionality communications device. The devices 102 can use any small data application. By non-limiting example, devices 102 can include a parking meter, security sensor, lock, garage door opener, a wireless access point, or any other MTC device. In additional examples, the devices 102 may comprise a mobile device, such as, but not limited to, a smartphone, cellular telephone, mobile phone, laptop computer, tablet computer, or other portable networked device. In addition, devices 102 may also be individually referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Even though some devices 102 transmit small data, the amount of signaling traffic sent on either the uplink or the downlink to or from these devices 102 can be significant. Some current systems that seek to reduce the signaling overhead re-use signaling architecture (e.g., radio resource control (RRC) signaling) to send small data signaling over logical and transport channels used for larger data or higher priority data. Nevertheless, the signaling data transmitted by devices 102 can continue to overwhelm mobile networks.

Furthermore, operators may not be able to differentiate small data from other data when such data is transmitted on currently-used channels using the same default context. Accordingly, mechanisms are not available or possible for providing quality of service (QoS) adapted to expected characteristics of small-data devices.

Embodiments provide a small data radio bearer (SDRB) architecture for small data transmission (SDT) over the radio access network (RAN). By using radio bearers specific for small data, embodiments can reduce use of signaling resources for sending small data.

Figure 2:
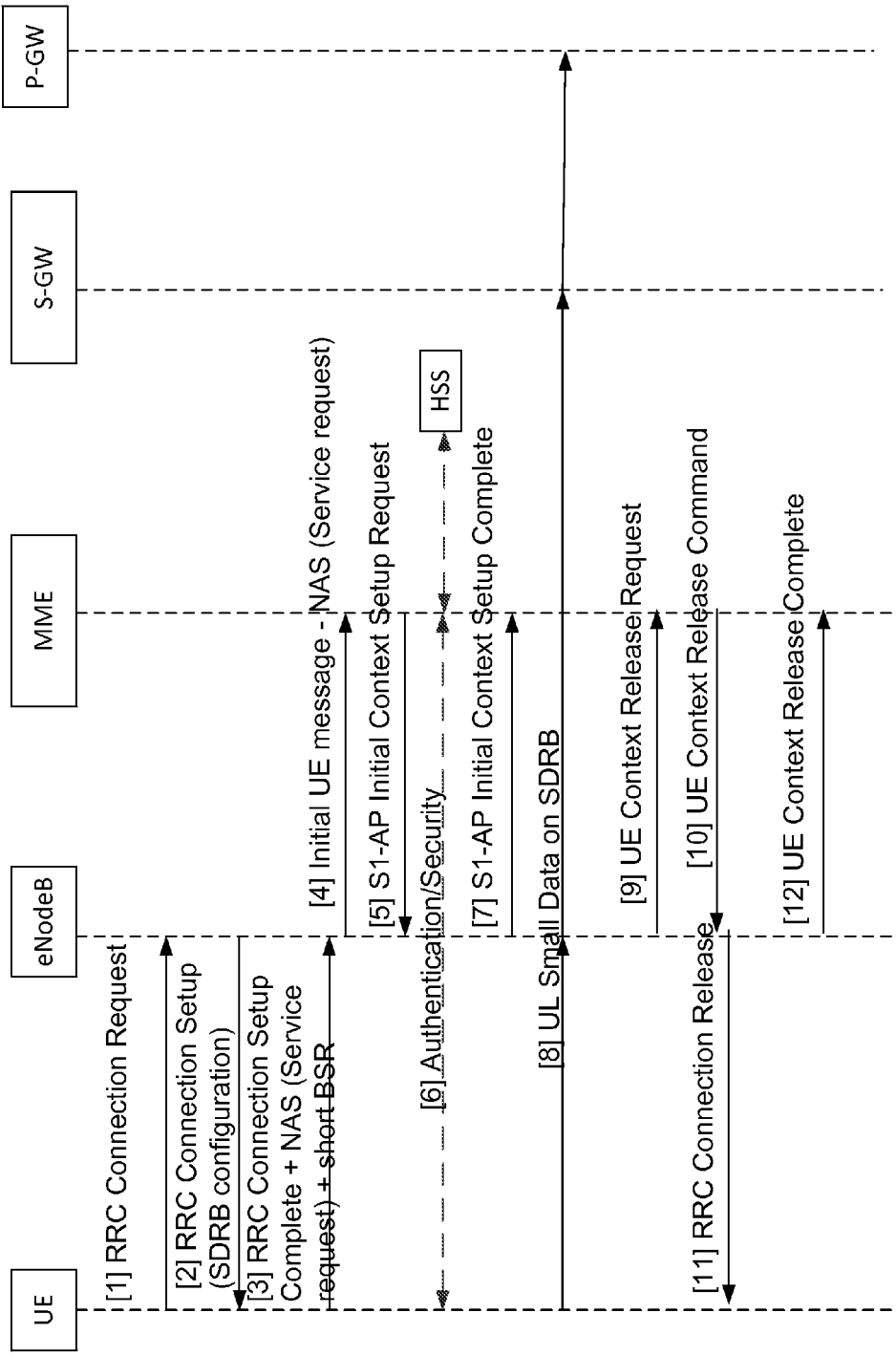
FIG. 2 is an example signal flow diagram illustrating a procedure for configuring a small data radio bearer in accordance with a first embodiment.

FIG. 2 is an example signal flow diagram illustrating a procedure for configuring an SDRB in accordance with a first embodiment. While FIG. 2 shows several example messages and signals that can be generated, embodiments are not limited thereto. Other signals and messages can pass between the illustrated entities or other entities. Additionally, other IEs can be transmitted in addition or instead of the IEs discussed herein. The UE may be suitable as a device 102 (FIG. 1). The eNodeB may be suitable as eNodeB 106. Signals may also be exchanged between the UE or eNodeB and a mobility management entity (MME), serving gateway (S-GW), packet gateway (P-GW) and home subscriber server (HSS).

In signal 1, the UE transmits a RRC Connection Request to the eNodeB. The UE may request the establishment of an RRC connection specifically for Small Data. The UE may request this, for example, by sending the request with an Establishment Cause that specifies Small Data in order to indicate that the UE will be transmitting small data.

In signal 2, the UE receives an RRC Connection Setup message from the eNodeB. This message can include an SDRB configuaration. This configuration can include a mapping to an LCID. However, embodiments are not limited thereto. The mapping can include mappings to uplink channels, downlink channels, multicast channels, etc. In some embodiments, the SDRB or associated LCID can be mapped to a dedicated traffic channel (DTCH) or alternatively to a dedicated control channel (DCCH).

In signal 3, the UE transmits an RRC Connection Setup Complete message to the eNodeB. This message can include, for example, a non-access stratum (NAS) service request and a buffer status report (BSR). In signal 4, the eNodeB transmits the NAS service request to the MME. In signal 5, the eNodeB receives an initial context setup request message to set up initial context for the UE. The context can include, for example, S1-AP context such as a security key, handover restriction lists, UE security capabilities, other UE capabilities, etc., though embodiments are not limited thereto.

In signal 6, authentication and security is configured with the HSS. In signal 7, the eNodeB informs the MME that initial context setup is complete.

In signal 8, the UE transmits small data. The UE can use the SDRB that was configured with signals 1-7. While the description herein describes signaling of one sequence, embodiments are not limited thereto, and some signaling can occur in a different order than that described herein. For example, in some embodiments, the UE may wait for security mechanisms of signal 6 to complete before transmitting on the SDRB, while in other embodiments, the UE may transmit on the SDRB before completion of signal 6. In some embodiments, signal 6 may not be generated and the UE may operate on the SDRB without authentication and security keys or other context information.

In signals 9-12, the SDRB connection can be released. For example, in signal 9, the eNodeB may signal to the MME that the UE wishes to release the context with a UE Context Release Request message. In signal 10, the MME may respond with a UE Context Release command. In signal 11, the eNodeB transmits an RRC Connection Release command to the UE. In signal 12, the eNodeB signals that the context release is complete by transmitting a UE Context Release Complete message to the MME. The releasing signals 9-12 may be triggered immediately after SDT or after a certain amount of time, though embodiments are not limited thereto. The RRC Connection Release includes the release of established radio bearers as well as all radio resources.

Figure 3:
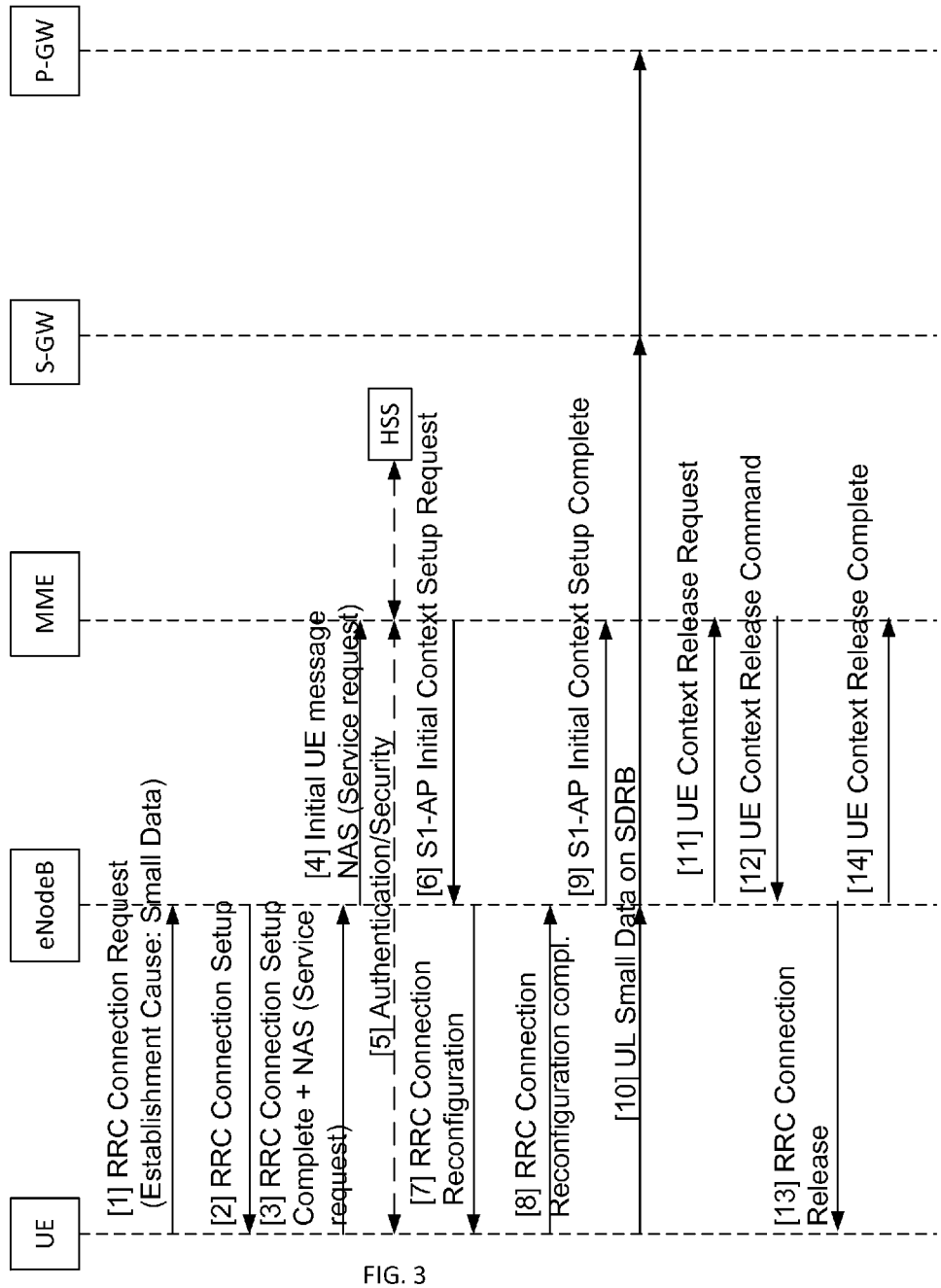
FIG. 3 is an example signal flow diagram illustrating a procedure for configuring a small data radio bearer in accordance with a second embodiment.

FIG. 3 is a signal flow diagram illustrating a procedure for configuring an SDRB in accordance with a second embodiment. While FIG. 3 shows several example messages and signals that can be generated, embodiments are not limited thereto. Other signals and messages can pass between the illustrated entities or other entities. Additionally, other IEs can be transmitted in addition or instead of the IEs discussed herein. The UE may be suitable as a device 102 (FIG. 1). The eNodeB may be suitable as eNodeB 106. Signals may also be exchanged between the UE or eNodeB and a MME, S-GW and P-GW.

In signal 1, the UE transmits a RRC Connection Request to the eNodeB. The UE may send the request with an Establishment Cause that specifies Small Data in order to indicate that the UE will be transmitting small data.

In signal 2, the UE receives an RRC Connection Setup message from the eNodeB. In contrast to that described regarding FIG. 2, this message does not include an SDRB configuaration.

In signal 3, the UE transmits an RRC Connection Setup Complete message to the eNodeB. This message can include a non-access stratum (NAS) extended service request. In signal 4, the eNodeB transmits the NAS service request to the MME.

In signal 5, authentication and security is configured with the HSS.

In signal 6, the eNodeB receives an initial context setup request from the MME to set up initial context for the UE. The context can include, for example, S1-AP context such as a security key, handover restriction lists, UE security capabilities, other UE capabilities, etc., though embodiments are not limited thereto.

In signal 7, the eNodeB transmits an RRC Connection Reconfiguration message that includes SDRB information such as an LCID to which the SDRB is mapped. In contrast to embodiments described regarding FIG. 2, security shall have been configured before the UE is permitted to transmit on the SDRB. In other words, the UE does not receive SDRB information for transmitting until after signal 5, in which authentication and security was established.

In signal 8, the UE notifies the eNodeB that the RRC Connection Reconfiguration is complete.

In signal 9, the eNodeB informs the MME that initial context setup is complete.

In signal 10, the UE transmits small data. The UE can use the SDRB that was configured with signals 1-9. While the description herein describes signaling of one sequence, embodiments are not limited thereto, and some signaling can occur in a different order than that described herein.

In signals 11-14, the SDRB connection can be released. For example, in signal 11, the eNodeB may signal to the MME that the UE wishes to release the context with a UE Context Release Request message. In signal 12, the MME may respond with a UE Context Release command. In signal 13, the eNodeB transmits an RRC Connection Release command to the UE. In signal 14, the eNodeB signals that the context release is complete by transmitting a UE Context Release Complete message to the MME. The releasing signals 11-14 may be triggered immediately after SDT or after a certain amount of time, though embodiments are not limited thereto. The RRC Connection Release includes the release of established radio bearers as well as all radio resources.

Regarding FIGS. 2 and 3, the NAS message, sent within RRC Connection Setup Complete may refer to a Service Request or an Extended Service Request. If the NAS message is an Extended Service Request in accordance with a standard of the 3GPP family of standards, the Device Properties IE of the Extended Service Request may be modified to include the indication of Small Data.

FIG. 4 is an example Device Properties IE in accordance with some embodiments. As shown in FIG. 4 a bit, for example a Small Data bit, can be set to, for example 0 or 1, to indicate whether a UE is configured for SDT. By providing an SDRB, operators can map SDRB to QCI characteristics defined for small data. For example, a Small Data Traffic characteristic can be defined as shown in Table 1.

TABLE 1

Standardized QCI characteristics with QCI for small data traffic

| QCI | Resource Type | Priority | Packet Delay Budget | Packet Error Loss Rate | Example Services |
|---|---|---|---|---|---|
| 1 | GBR | 2 | 100 ms | $10^{-2}$ | Conversational Voice |
| 2 | GBR | 4 | 150 ms | $10^{-3}$ | Conversational Video (Live Streaming) |
| 3 | GBR | 3 | 50 ms | $10^{-3}$ | Real Time Gaming |
| 4 | GBR | 5 | 300 ms | $10^{-6}$ | Non-Conversational Video (Buffered Streaming) |
| 5 | Non-GBR | 1 | 100 ms | $10^{-6}$ | IMS Signaling |
| 6 | Non-GBR | 6 | 300 ms | $10^{-6}$ | Video (Buffered Streaming) TCP-based (e.g., www, e-mail, chat, ftp, p2p file sharing, progressive video, etc.) |
| 7 | Non-GBR | 7 | 100 ms | $10^{-3}$ | Voice, Video (Live Streaming) Interactive Gaming |
| 8 | Non-GBR | 8 | 300 ms | $10^{-6}$ | Video (Buffered Streaming) TCP-based (e.g., www, e-mail, chat, ftp, p2p file sharing, progressive video, etc.) |
| 9 | Non-GBR | 9 | 300 ms | $10^{-6}$ | Video (Buffered Streaming) TCP-based (e.g., www, e-mail, chat, ftp, p2p file sharing, progressive video, etc.) |
| 10 | Non-GBR | 10 | | $10^{-6}$ | Small Data traffic |

In some embodiments, SDRB can be used when the establishment cause for the RRC Connection specifies a "delay tolerant" application that is deemed of low priority.

Embodiments described herein can allow operators to implement mechanisms to allow SDT by many devices 102 while not affecting the QoS of other devices 102 that are not performing SDT. By providing an SDRB, operators can control and prioritize radio bearers according to operator needs. Operators can allocate specific bandwidths for SDRBs, install dedicated eNodeBs to deal with SDT, or use SDRB to deliver some types of traffic to make the network more available for higher priority traffic. SDRB can be configured for various radio link control (RLC) modes, including transport mode (TM), unacknowledged mode (UM), acknowledge mode (AM), etc.

Some embodiments can use the SDRB to help provide load balancing to distribute cell load among neighboring cells or to transfer traffic from congested cells. At least these embodiments can use self-optimization of mobility parameters or handover actions. Load balancing can include operations such as load reporting, load balancing actions based on handovers, and adapting handover or reselection configuration. Load information can include radio resource usage, hardware load indicators, transport network layer (TNL) load indicators, cell capacity class values, and values for indicating the capacity available for load balancing as a percentage of total cell capacity. Embodiments are not limited to a particular implementation of load balancing or to any particular parameter to be used for load balancing, which are understood by those of ordinary skill in the art as being vendor-specific and implementation-specific.

Various embodiments can provide load balancing by controlling which kind of devices 102 can connect to the network, based on for example the small data RRC establishment cause or other establishment cause as described regarding FIG. 2-3. Various embodiments can provide load balancing by controlling the types of data that devices 102 can send at certain times, based on for example Quality of Service class identifiers (QCI) and device or application priority levels. For example, in some embodiments, a device 102 can be configured as having low access priority, extended wait timers can be used to reject RRC connections, or a mobility management entity (MME) can reject RRC connections from some categories of devices 102.

Embodiments are described herein with respect to an LTE system operating in frequency division duplex (FDD) mode. However, other embodiments can be applicable to other radio access technologies and duplexing modes specified in 3GPP, i.e. LTE/LTE-Advanced FDD and LTE/LTE-Advanced TDD.

Example Device for Implementing Embodiments

Figure 5:
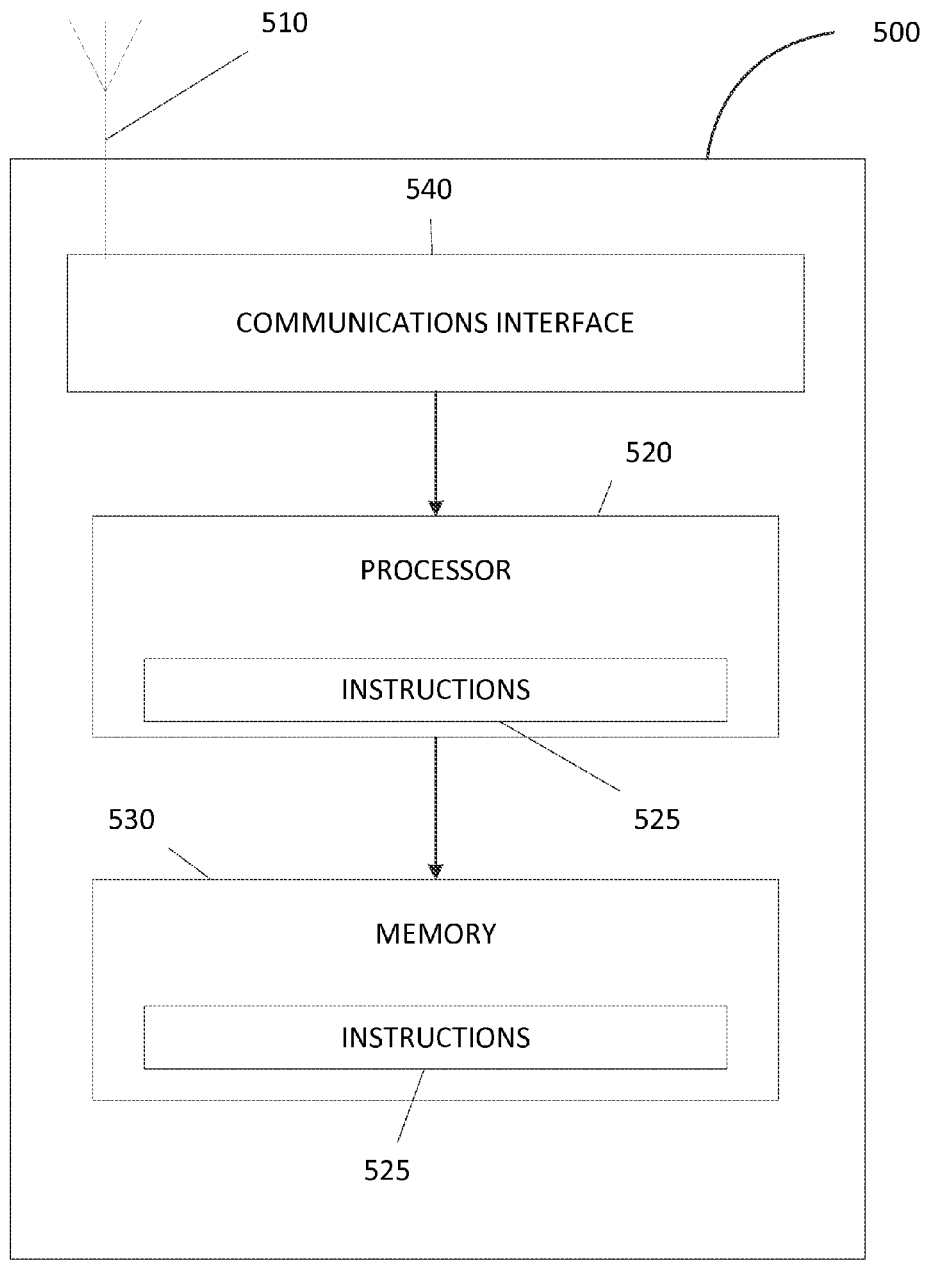
FIG. 5 is a block diagram of the basic components of user equipment in accordance with some embodiments.

FIG. 5 is a block diagram of the basic components of a UE 500 in accordance with some embodiments. The UE 500 may be suitable as a device 102 (FIG. 1). The UE 500 may support methods for small data transmission, in accordance with embodiments described above with respect to FIGS. 1-4 and Table 1.

The UE 500 includes one or more antennas 510 arranged to communicate with a base station (BS), the eNodeB 106 (FIG. 1), or other types of wireless local area network (WLAN) access points. The UE 500 further includes a processor 520, instructions 525, and a memory 530. The UE 500 may further include a communications interface 540. In one embodiment, the memory 530 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

In at least one embodiment, the communications interface 540 is, for example, a wireless physical layer which operates according to a multiple input/multiple output (MIMO) operation. As described above with respect to FIG. 2-4, processor 520 may determine a size of data to be transmitted by the UE and characterize the data as small data if the size of the data is below a threshold.

Responsive to characterizing the data as small data, the communications interface 540 will transmit a message indicating that the UE 500 will be transmitting small data. This message may include a non-access stratum (NAS) extended service request that includes a device properties information element (IE) indicating that the UE 500 is establishing the connection for small data transmission.

The communications interface 540 will transmit small data subsequent to receiving a notification that an SDRB has been configured for transmission of the small data. The UE 500 may refrain from transmitting data other than small data on the SDRB. The SDRB can be mapped to a dedicated transport channel (DTCH) defined in accordance with a standard of the 3rd Generation Partnership Project (3GPP) family of standards. However, embodiments are not limited thereto, and the SDRB can be mapped to other channels and the SDRB can be mapped to different uplink, downlink, and multicast channels. The SDRB can be mapped to a quality control indicator (QCI) that defines a quality of service (QoS) for small data traffic, or to any other QCI as desired by an operator.

The communications interface 540 can receive notification that an SDRB has been configured in a Radio Resource Control (RRC) Connection Setup message. The communications interface 540 can refrain from transmitting on the SDRB until the communications interface 540 receives a security notification that security mechanisms are configured. However, embodiments are not limited thereto, and the communications interface 540 can transmit small data on the SDRB without waiting to receive a security notification notifying the UE that security mechanisms are configured on the SDRB.

However, as described regarding FIG. 3, the communications interface 540 may not transmit using the SDRB before security mechanisms are in place, if the notification was received in a Radio Resource Control (RRC) Connection Reconfiguration message, at least because SDRB configuration information will not have been received until after security mechanisms are in place.

The processor 520 may include logic or code to enable the UE 500 to process signals received from the network through the antenna 510. The processor 520 may include code or other instructions 525 to allow the UE 500 to determine a size of data to be transmitted by the UE 500 and to characterize the data as small data if the size of the data is below a threshold. The instructions 525 may further allow the UE 500 transmit a message indicating that the UE shall be transmitting small data. The instructions 525 may further allow the UE 500 to transmit small data subsequent to receiving a notification that an SDRB has been configured for transmission of the small data. The instructions 525 may additionally or alternatively reside in the memory 530. The processor 520 and the memory 530 may therefore comprise computer-readable media.

Example eNodeB for Implementing Embodiments

Figure 6:
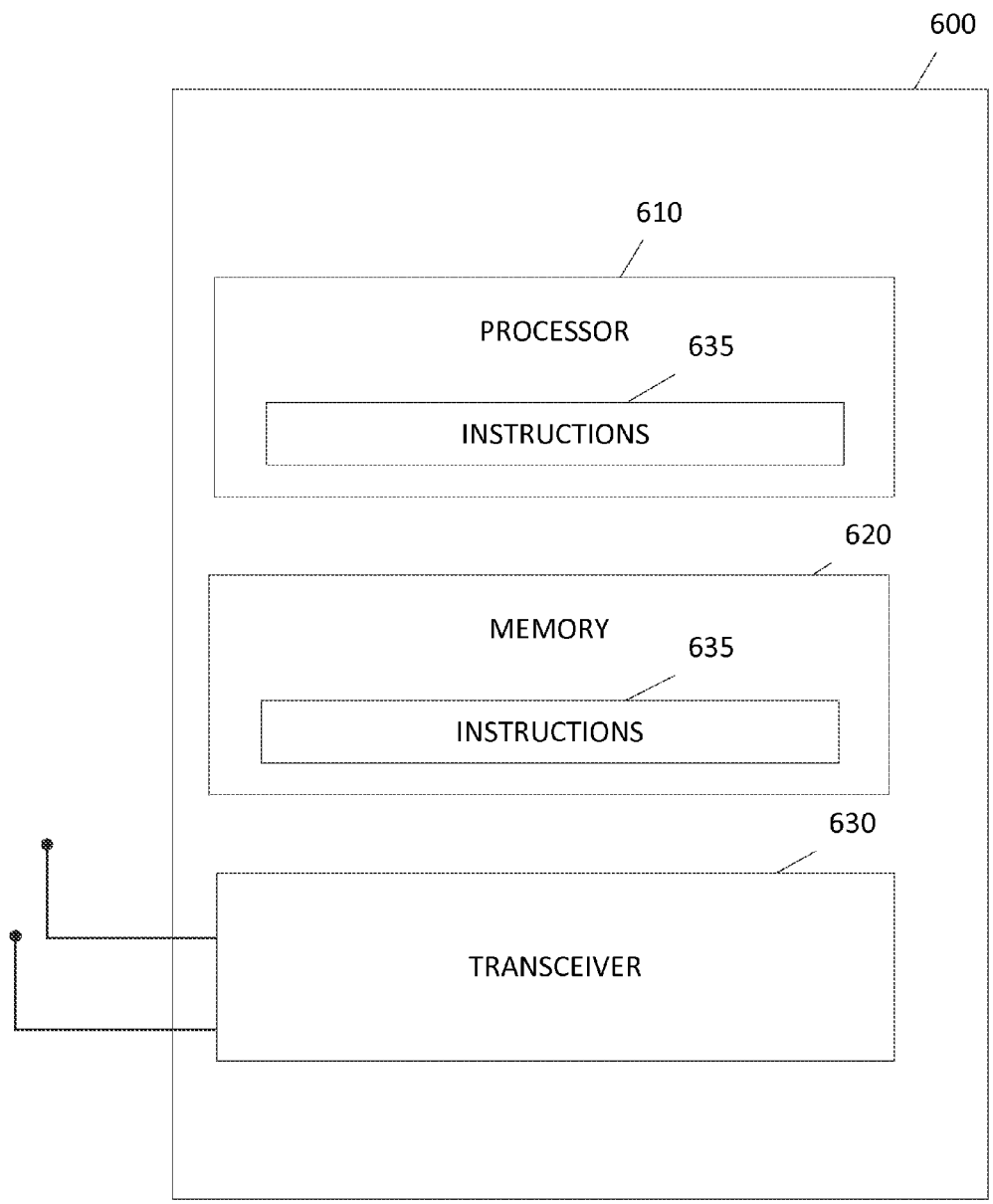
FIG. 6 is a block diagram showing details of an eNodeB according to some embodiments.

FIG. 6 is a block diagram showing details of an eNodeB 600 according to some embodiments. The eNodeB 600 may be suitable as an eNodeB 106 (FIG. 1). The eNodeB 600 may provide or assign UL resources to the UE 500 (FIG. 5) or device 102. The eNodeB 600 may include a processor 610, a memory 620, a transceiver 630, and instructions 635. The eNodeB 600 may include other elements (not shown).

The processor 610 comprises one or more central processing units (CPUs), graphics processing units (GPUs), or both. The processor 610 provides processing and control functionalities for the eNodeB 600. Memory 620 comprises one or more transient and static memory units configured to store instructions 635 and data for the eNodeB 600.

The transceiver 630 comprises one or more transceivers including a multiple-input and multiple-output (MIMO) antenna to support MIMO communications. The transceiver 630 receives UL transmissions and transmits DL transmissions, among other things, from and to devices 102 (FIG. 1).

The instructions 635 comprise one or more sets of instructions or software executed on a computing device (or machine) to cause such computing device (or machine) to perform any of the methodologies discussed herein. The instructions 635 (also referred to as computer- or machine-executable instructions) may reside, completely or at least partially, within the processor 610 and/or the memory 620 during execution thereof by the eNodeB 600. The processor 610 and memory 620 also comprise machine-readable media.

The transceiver 630 can receive a Radio Resource Control (RRC) connection request from a user equipment (UE) indicating that the UE shall be transmitting small data. The indication may occur through use of that includes an establishment cause field. Subsequent to receiving the request, the transceiver 630 can transmit a response to the request that includes a logical channel identifier (LCID) of an SDRB for use in transmitting small data. The transceiver 630 can transmit the LCID of the SDRB in an RRC Connection Setup message or in an RRC Connection Reconfigured message.

The processor 610 can determine whether an RRC connection complete message received from the UE includes a non-access stratum (NAS) extended service request that includes a device properties information element (IE) indicating that an SDRB should be established. The processor 610 can configure a request message to an MME that includes configuration information based on the device properties IE described regarding FIG. 2-3, or on other information that indicates whether the UE 600 is a low-priority UE.

As those skilled in the art will readily appreciate, various aspects described throughout this disclosure may be extended to other telecommunication systems, network architectures and communication standards. By way of non-limiting example, various aspects may be extended to other Universal Mobile Telecommunications System (UMTS) systems. Various aspects can be used in systems employing Long Term Evolution (LTE) (in FDD, TDD, or both modes), and LTE-Advanced (LTE-A) (in FDD, TDD, or both modes).

Examples, as described herein, may include, or may operate on, logic or a number of components, components, or mechanisms. Components are tangible entities capable of performing specified operations and may be configured or arranged in a certain manner. In an example, circuits may be arranged (e.g. internally or with respect to external entities such as other circuits) in a specified manner as a component. In an example, the whole or part of one or more computer systems (e.g. a standalone, client or server computer system) or one or more hardware processors may be configured by firmware or software (e.g. instructions, an application portion, or an application) as a component that operates to perform specified operations. In an example, the software may reside (1) on a non-transitory machine-readable medium or (2) in a transmission signal. In an example, the software, when executed by the underlying hardware of the component, causes the hardware to perform the specified operations.

Accordingly, the terms "component" and "component" are understood to encompass a tangible entity, be that an entity that is physically constructed, specifically configured (e.g. hardwired), or temporarily (e.g. transitorily) configured (e.g. programmed) to operate in a specified manner or to perform part or all of any operation described herein. Considering examples in which components are temporarily configured, one instantiation of a component may not exist simultaneously with another instantiation of the same or different component. For example, where the components comprise a general-purpose hardware processor configured using software, the general-purpose hardware processor may be configured as respective different components at different times. Accordingly, software may configure a hardware processor, for example, to constitute a particular component at one instance of time and to constitute a different component at a different instance of time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The preceding description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

Additional Notes & Examples

Example 1 may include subject matter (such as a method, means for performing acts, machine readable medium including instructions that, when performed by a machine cause the machine to performs acts, or an apparatus configured to perform), comprising determining that data to be transmitted by the UE is small data if a size of the data is below a threshold; transmitting a message indicating that the UE shall be transmitting small data responsive to determining that data to be transmitted by the UE is small data; receiving, in response to transmitting the message, a radio resource control (RRC) signal from an evolved Node B (eNodeB) in accordance with a standard of the $3^{rd}$ Generation Partnership Project (3GPP) family of standards that includes a logical channel identifier (LCID) of a small data radio bearer (SDRB) configured for transmission of small data; transmitting small data on the SDRB subsequent to receiving the RRC signal from the eNodeB; and refraining from transmitting other than small data on the SDRB.

Example 2 may include, or may optionally be combined with the subject matter of Example 1 to optionally include determining whether to refrain from transmitting on the SDRB until a security notification has been received, the security notification indicating that security mechanisms are in place.

Example 3 may include, or may optionally be combined with the subject matter of Examples 1 and/or 2 to optionally include an aspect wherein determining whether to refrain is based on whether the UE is stationary or mobile, or on a security status of applications executing on the UE.

Example 4 may include, or may optionally be combined with the subject matter of any of Examples 1-3, to optionally include transmitting an RRC Connection Setup Complete message that includes a non-access stratum (NAS) extended service request that includes a device properties information element (IE) indicating that the UE is establishing the connection for small data.

Example 5 may include, or may optionally be combined with the subject matter of any of Examples 1-4, to optionally include an aspect wherein the SDRB is mapped to a dedicated transport channel (DTCH) channel for uplink communications and wherein the SDRB is mapped to a quality control indicator (QCI) that defines a quality of service (QoS) for small data traffic.

Example 6 may include subject matter (such as an apparatus, mobile apparatus, MTC device, user equipment, network device, eNodeB, communication apparatus or device, hardware, component, or component), which may optionally be in addition to any one or combination of Examples 1-5, comprising processing circuitry to determine a size of data to be transmitted by the UE; and characterize the data as small data if the size of the data is below a threshold; and physical layer circuitry to transmit a message indicating that the UE shall be transmitting small data; and transmit small data subsequent to receiving a notification that a small data radio bearer (SDRB) has been configured for transmission of the small data.

Example 7 may include subject matter (such as an apparatus, mobile apparatus, MTC device, user equipment, network device, eNodeB, communication apparatus or device, hardware, component, or component), which may optionally be in addition to any one or combination of Examples 1-6, to optionally include an aspect wherein the notification is received in a Radio Resource Control (RRC) Connection Setup message.

Example 8 may include subject matter (such as an apparatus, mobile apparatus, MTC device, user equipment, network device, eNodeB, communication apparatus or device, hardware, component, or component), which may optionally be in addition to any one or combination of Examples 1-7, to optionally include an aspect wherein the physical layer circuitry is further arranged to refrain from transmitting on the SDRB until the physical layer circuitry receives a security notification notifying the UE that security mechanisms are configured.

Example 9 may include subject matter (such as an apparatus, mobile apparatus, MTC device, user equipment, network device, eNodeB, communication apparatus or device, hardware, component, or component), which may optionally be in addition to any one or combination of Examples 1-8, to optionally include an aspect wherein the physical layer circuitry is arranged to transmit small data on the SDRB without waiting to receive a security notification notifying the UE that security mechanisms are configured on the SDRB.

Example 10 may include subject matter (such as an apparatus, mobile apparatus, MTC device, user equipment, network device, eNodeB, communication apparatus or device, hardware, component, or component), which may optionally be in addition to any one or combination of Examples 1-9, to optionally include an aspect wherein the notification is received in a Radio Resource Control (RRC) Connection Reconfiguration message, and the physical layer circuitry is further arranged to refrain from transmitting on the SDRB until a time subsequent receiving a security notification notifying the UE that security mechanisms are configured on the SDRB.

Example 11 may include subject matter (such as an apparatus, mobile apparatus, MTC device, user equipment, network device, eNodeB, communication apparatus or device, hardware, component, or component), which may optionally be in addition to any one or combination of Examples 1-10, to optionally include an aspect wherein the message indicating that the UE shall be transmitting small data includes a non-access stratum (NAS) extended service request that includes a device properties information element (IE) indicating that a UE is establishing the connection for small data transmission.

Example 12 may include subject matter (such as an apparatus, mobile apparatus, MTC device, user equipment, network device, eNodeB, communication apparatus or device, hardware, component, or component), which may optionally be in addition to any one or combination of Examples 1-11, to optionally include an aspect wherein the physical layer circuitry refrains from transmitting data other than small data on the SDRB.

Example 13 may include subject matter (such as an apparatus, mobile apparatus, MTC device, user equipment, network device, eNodeB, communication apparatus or device, hardware, component, or component), which may optionally be in addition to any one or combination of Examples 1-12, to optionally include an aspect wherein the SDRB is mapped to a dedicated transport channel (DTCH)

defined in accordance with a standard of the 3rd Generation Partnership Project (3GPP) family of standards.

Example 14 may include subject matter (such as an apparatus, mobile apparatus, MTC device, user equipment, network device, eNodeB, communication apparatus or device, hardware, component, or component), which may optionally be in addition to any one or combination of Examples 1-13, to optionally include an aspect wherein the SDRB is mapped to a quality control indicator (QCI) that defines a quality of service (QoS) for small data traffic.

Example 15 may include subject matter (such as an apparatus, mobile apparatus, MTC device, user equipment, network device, eNodeB, communication apparatus or device, hardware, component, or component), which may optionally be in addition to any one or combination of Examples 1-14, comprise a transceiver arranged to receive a Radio Resource Control (RRC) connection request from a user equipment (UE) that includes an establishment cause field indicating that the UE shall be transmitting small data; and transmit, subsequent to receiving the request, a response to the request that includes a logical channel identifier (LCID) of a small data radio bearer (SDRB) for use in transmitting small data.

Example 16 may include subject matter (such as an apparatus, mobile apparatus, MTC device, user equipment, network device, eNodeB, communication apparatus or device, hardware, component, or component), which may optionally be in addition to any one or combination of Examples 1-15, to optionally include an aspect wherein the transceiver is arranged to transmit the LCID of the SDRB in an RRC Connection Setup message or in an RRC Connection Reconfigured message.

Example 17 may include subject matter (such as an apparatus, mobile apparatus, MTC device, user equipment, network device, eNodeB, communication apparatus or device, hardware, component, or component), which may optionally be in addition to any one or combination of Examples 1-16, to optionally include a processor arranged to determine whether an RRC connection complete message received from the UE includes a non-access stratum (NAS) extended service request that includes a device properties information element (IE) indicating that an SDRB should be established; and configure a request message to a MME, the request message including configuration information based on the device properties IE if the RRC connection request includes the device properties IE, or other information that indicates whether the UE is a low-priority UE if the RRC connection request does not include the device properties IE.

Example 18 may include subject matter (such as a method, means for performing acts, machine readable medium including instructions that, when performed by a machine cause the machine to performs acts, or an apparatus configured to perform), which may optionally be in addition to any one or combination of Examples 1-17 comprising receiving a Radio Resource Control (RRC) connection request from a user equipment (UE) that includes an establishment cause field indicating that the UE shall be transmitting small data; and transmitting a response to the request that includes a logical channel identifier (LCID) of a small data radio bearer (SDRB) for use in transmitting small data.

Example 19 may include, or may optionally be combined with the subject matter of Example 1-18 to optionally include an aspect wherein the SDRB LCID is transmitted in an RRC Connection Setup message.

Example 20 may include, or may optionally be combined with the subject matter of Examples 1-19 to optionally include determining whether the UE has transmitted a non-access stratum (NAS) extended service request that includes a device properties information element (IE) indicating that the UE is establishing the connection for small data transmission; and configuring a request message to a Mobility Management Entity (MME), the request message including configuration information based on the device properties IE if the RRC connection request includes the device properties IE, or on other information that indicates whether the UE is a low-priority UE if the RRC connection request does no include the device properties IE.

What is claimed is:

1. A user equipment (UE) comprising:
   processing circuitry arranged to
   determine a size of data to be transmitted by the UE; and
   characterize the data as small data if the size of the data is below a threshold; and
   physical layer circuitry to be configured by the processing circuitry, responsive to the characterizing, to
   transmit a message indicating that the UE shall be transmitting small data, wherein the message indicating that the UE shall be transmitting small data includes a non-access stratum (NAS) extended service request that includes a device properties information element (IE) indicating that a UE is establishing the connection for small data transmission; and
   transmit small data subsequent to receiving a notification that a small data radio bearer (SDRB) has been configured for transmission of the small data.

2. The UE of claim 1, wherein the notification is received in a Radio Resource Control (RRC) Connection Setup message.

3. The UE of claim 2, wherein the physical layer circuitry is further arranged to refrain from transmitting on the SDRB until the physical layer circuitry receives a security notification notifying the UE that security mechanisms are configured.

4. The UE of claim 2, wherein the physical layer circuitry is arranged to transmit small data on the SDRB without waiting to receive a security notification notifying the UE that security mechanisms are configured.

5. The UE of claim 1, wherein the notification is received in a Radio Resource Control (RRC) Connection Reconfiguration message, and the physical layer circuitry is further arranged to refrain from transmitting on the SDRB until a time subsequent receiving a security notification notifying the UE that security mechanisms are configured on the SDRB.

6. The UE of claim 1, wherein the UE refrains from transmitting data other than small data on the SDRB.

7. The UE of claim 1, wherein the SDRB is mapped to a dedicated transport channel (DTCH) defined in accordance with a standard of the 3rd Generation Partnership Project (3GPP) family of standards.

8. The UE of claim 1, wherein the SDRB is mapped to a quality control indicator (QCI) that defines a quality of service (QoS) for small data traffic.

9. A method, performed by user equipment (UE), for small data transmission, the method comprising:
   determining that data to be transmitted by the UE is small data if a size of the data is below a threshold;
   transmitting a message indicating that the UE shall be transmitting small data responsive to determining that data to be transmitted by the UE is small data;
   receiving, in response to transmitting the message, a radio resource control (RRC) signal from an evolved Node B (eNodeB) in accordance with a standard of the $3^{rd}$ Generation Partnership Project (3GPP) family of standards that includes a logical channel identifier (LCD) of a small data radio bearer (SDRB) configured for transmission of small data;

transmitting an RRC Connection Setup Complete message that includes a non-access stratum (NAS) extended service request that includes a device properties information element (IE) indicating that the UE is establishing the connection for small data;

transmitting small data on the SDRB subsequent to receiving the RRC signal from the eNodeB; and refraining from transmitting other than small data on the SDRB.

10. The method of claim 9, wherein the notification is received in a RRC Connection Setup message, and the method further comprises:

determining whether to refrain from transmitting on the SDRB until a security notification has been received, the security notification indicating that security mechanisms are in place.

11. The method of claim 10, wherein determining whether to refrain is based on whether the UE is stationary or mobile, or on a security status of applications executing on the UE.

12. The method of claim 10, wherein the SDRB is mapped to a dedicated transport channel (DTCH) channel for uplink communications and wherein the SDRB is mapped to a quality control indicator (QCI) that defines a quality of service (QoS) for small data traffic.

* * * * *

UNITED STATES PATENT AND TRADEMARK OFFICE
CERTIFICATE OF CORRECTION

PATENT NO. : 9,967,858 B2  
APPLICATION NO. : 14/766850  
DATED : May 8, 2018  
INVENTOR(S) : Bangolae et al.

Page 1 of 1

It is certified that error appears in the above-identified patent and that said Letters Patent is hereby corrected as shown below:

In the Claims

In Column 12, Line 13, in Claim 1, after "to", delete "¶"

In Column 12, Line 18, in Claim 1, after "to", delete "¶"

In Column 12, Line 52, in Claim 7, delete "3rd" and insert --3$^{rd}$-- therefor In Column 13, Line 1, in Claim 9, delete "(LCD)" and insert --(LCID)-- therefor Signed and Sealed this  
Twenty-eighth Day of April, 2020

Andrei Iancu  
*Director of the United States Patent and Trademark Office*